United States Patent [19]

Kaneko

[11] 3,793,513

[45] Feb. 19, 1974

[54] CIRCUITS AND METHODS FOR PROCESSING DELTA-MODULATED SIGNALS

[75] Inventor: Hisashi Kaneko, Tokyo, Japan

[73] Assignee: Nippon Electric Company, Limited, Tokyo, Japan

[22] Filed: May 15, 1972

[21] Appl. No.: 253,592

[30] Foreign Application Priority Data

May 19, 1971 Japan .............................. 46/33859

[52] U.S. Cl. ............................. 235/152, 325/38 B

[51] Int. Cl. ............................................. G06f 7/38

[58] Field of Search... 235/152, 156, 168; 325/38 B; 332/11 D

[56] References Cited

UNITED STATES PATENTS

| | | | |
|---|---|---|---|
| 3,500,205 | 3/1970 | Tudor-Owen | 332/11 D X |
| 3,706,944 | 12/1972 | Tewksbury | 325/38 B X |
| 3,516,022 | 6/1970 | Brolin | 325/38 B X |

*Primary Examiner*—Malcolm A. Morrison
*Assistant Examiner*—James F. Gottman
*Attorney, Agent, or Firm*—Sandoe, Hopgood & Calimafde

[57] ABSTRACT

A delta-modulated signal processing circuit includes one or more first multipliers for multiplying one or more delta-modulated input signals by preselected constants, thus producing a first code signal corresponding to each first multiplier. A second multiplier is provided for multiplying a delta-modulated output signal by a second constant having a sign opposite to that of the first constants to provide a second code signal. A digital adder takes the algebraic sum of the first and second code signals. The output of the digital adder is applied to an integrator to produce an output signal including sign-indicating bits. Also included in the circuit is a sign-bit extractor for extracting the sign-indicating bits from the output of the integrator. This provides the delta-modulated signal supplied to the second multiplier. Modifications of this circuit for various uses are disclosed.

5 Claims, 17 Drawing Figures

CIRCUITS AND METHODS FOR PROCESSING DELTA-MODULATED SIGNALS

BACKGROUND OF THE INVENTION

The present invention relates to a signal processing circuit and method for a delta-modulated signal. The term "delta-modulated signal" is used herein as a general term for the so-called "one bit at a time" code signal which is generated by a prediction-type coder performing the well-known single-integral-type delta modulation, double-integral-type delta modulation, or delta-sigma modulation. Double integral delta modulation is discussed in detail in "Delta modulation - A Method of PCM Transmission Using a 1-Unit Code" by F. de Jager (Philips Research Report, Vol. 7, p. 442, 1952), while delta-sigma modulation is explained in detail in "A Unity Bit Coding Method by Negative Feedback" by H. Inose et al. (Proceedings of the IEEE, Vol. 51, p. 1524, 1965). The term "signal processing" as used herein included all the signal processes of addition and subtraction between at least two input signals, the multiplication of an input signal by a constant, the attenuation or filtering of an input signal, clock speed transformation, mutual transformation between a delta-modulated signal and a PCM signal, mutual transformation between a delta modulated signal and an adaptation-type delta-modulated signal, mutual transformation between a delta-modulated signal and a delta-sigma modulated signal.

In prior-art signal processing circuits for performing the above-mentioned functions, a delta-modulated signal is first transformed into a PCM signal. Since the processing of a PCM signal requires a digital circuit of 10 to 30 bits for one word, the circuit arrangement is complex and costly to manufacture.

It is accordingly a principal object of the present invention to provide a signal processing circuit and method which applies digital signal processing directly to the incoming delta-modulated input signal without transforming the latter into a PCM signal.

Another object of the present invention is to provide a signal processing circuit and method adapted to digital signal processing, such as digital filtering, which is achieved by means of a simpler and less costly circuit construction than those found in the prior art.

Still another object of the present invention is to provide a signal processing circuit and method adapted to mutually transform information signals between various delta modulation system.

BRIEF DESCRIPTION OF THE DRAWINGS

The invention is described in greater detail below with reference to the accompanying drawings, in which.

DESCRIPTION OF THE PREFERRED EMBODIMENTS

For simplicity, a single integral type delta-modulated signal is used as an example in the following description.

Figure 1:
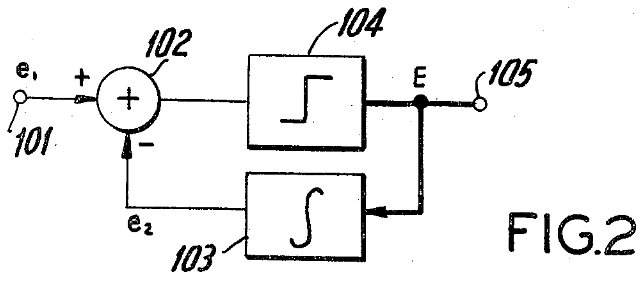
FIG.1 PRIOR ART
FIG. 1 is a block diagram of a previously known delta modulation circuit.
Figure 2A:
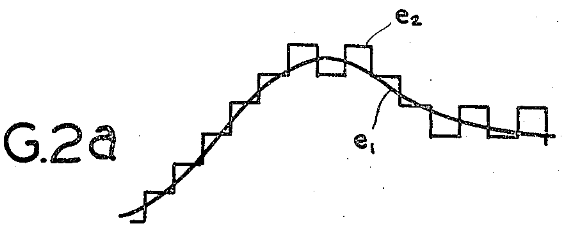
FIGS. 2*a* and 2*b* are waveform diagrams used to explain the operation of the circuit of FIG. 1.
Figure 2B:
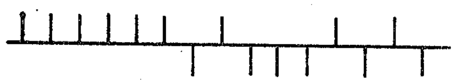

Referring first to FIG. 1, a previously known delta modulation circuit will be explained. An input analog signal $e_1$, such as a voice signal, is fed to an input terminal 101 and passed via a subtractor 102 to a polarity discriminator 104 which generates a +1 pulse when the polarity is positive, but generates a −1 pulse when it is negative. These pulses are demodulated by an integrator 103 to obtain an analog signal $e_2$ which is fed back to the subtractor 102. The input signal $e_1$ and the demodulated signal $e_2$ are therefore coded such that, as shown in FIG. 2*a*, the input $e_1$ is followed by step waves $e_2$. A delta-modulated signal shown in FIG. 2*b* is a +1 pulse when the step wave rises, and a −1 pulse when it descends (as explained in the above-mentioned article by F. de Jager). Although the output signal of FIG. 2*b* is represented by the binary code format of +1 and −1, it may also be in the form of another binary code format of 1 and 0, as is well known.

A PCM signal subjected to uniform quantization is generally composed of succeeding *n*-bit words (*n*being a positive integer), and filtering, attenuation, transformation, etc. may, as is well known, be accomplished digitally by prior-art digital arithmetic circuits (see, for examples, pages 218 – 285 of "System Analysis by Digital Computer" by F.F. Kuo and J.F. Kaiser, John Wiley & Sons, Inc., New York, 1967). The digital processing circuit of the present invention subjects a delta-modulated code signal to direct digital processing without transforming it into a PCM signal first. Since delta modulation uses only one bit per word, the circuit arrangement is remarkably simplified. Even when the circuit arrangement of this invention is compared with a PCM serial arithmetic circuit, which is simpler than a PCM parallel arithmetic circuit, the constant coefficient multiplier used in the circuit of the invention is particularly simplified. Thus, the processing of the information is greatly simplified.

Figure 3:
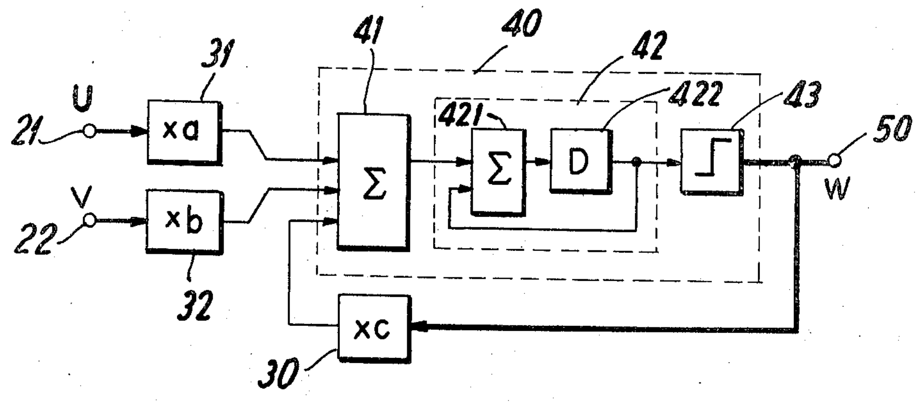
FIG. 3 shows, in block form, the fundamental construction of a first embodiment of the present invention.

FIG. 3 shows a delta-modulated signal adding circuit which is the fundamental part of the present invention. It is assumed that two delta-modulated binary code input signals U and V are applied to two input terminals 21 and 22. The signals U and V, respectively, are obtained from two original analog signals *u* and *v* which are modulated by means of a delta-modulation circuit as shown in FIG. 1. The input signals U and V, respectively, are multiplied by coefficients $a$ and $b$ at coefficient circuits 31 and 32, the coefficient circuits thus forming first multiplying means. The coefficient circuits 31 and 32 are constructed such that, if the coefficient $a$ is, e.g., 2, a code 010 is generated when the input U is a code +1, while a code 110 is generated when it is a code −1 on the basis of a known binary code calculating table, Table 1.

TABLE 1

| | | | |
|---|---|---|---|
| 3 | 011 | −1 | 111 |
| 2 | 010 | −2 | 110 |
| 1 | 001 | −3 | 101 |
| 0 | 000 | −4 | 100 |

Well-known pattern generator circuits or read only memories may be employed as such coefficient circuits. The output signals of these coefficient circuits 31 and 32 shall be called "first code signals." The first code signals are applied to a converter 40 which is composed of an adder means 41, an integrator means 42 and a sign-bit extracting means 43. The details of the construction of these circuits are well known to those skilled in the art. The plurality of first code signals applied to converter 40 are summed algebraically by the adder 41 and, thereafter, integrated by the integrator 42. The integrator means 42 is a so-called accumulator which is composed, e.g., of an adder 421, a delay means 422 having a delay equal to one clock period, and a feedback path from the output of the delay circuit 422 to the adder circuit 421. Accordingly, the digital inputs of the integrator 42 are accumulated at every clock period, and an integrated digital output is produced. The integrated output signal consists of succeeding words with plural bit codes. Among those bit codes, only the sign-indicating bit representing the polarity, i.e., the first bit of the binary codes in Table 1, is extracted by the sign-bit extracting means 43. Thus, an output delta-modulated signal W is fed to an output terminal 50. In the drawings, the delta-modulated signals, that is to say codes of one bit at a time, are carried by the heavy connection lines, while the codes of a work construction of two or more bits are carried by the thin lines. Although the sign-bit extracting means 43 may consist of only a connection line for deriving the sign bit and requires no further circuit arrangement, it is represented in FIG. 3 by a block to show its function. The output code W is multiplied by a coefficient $c$ by means of a coefficient circuit 30 (the resultant signal being termed the "second code signal"), and is fed back to the adder circuit 41. Of course, it arrives later in time than the portion of first code signal from which it is derived because of the delay means 422. The coefficient circuit 30 forms a second multiplier means which multiplies by a constant having a sign opposite the constants of the first multiplier means (coefficient circuit 31 and 32). The algebraic sum between the second code and the first code is then taken by the adder 41. The coefficients $a$, $b$ and $c$ are not restricted to integers; they may have numerical values below the decimal point (for further details, see "Digital Computer Design Fundamentals" by Y. Chu, McGraw Hill Book Co., New York, 1962).

Figures 4, 5:
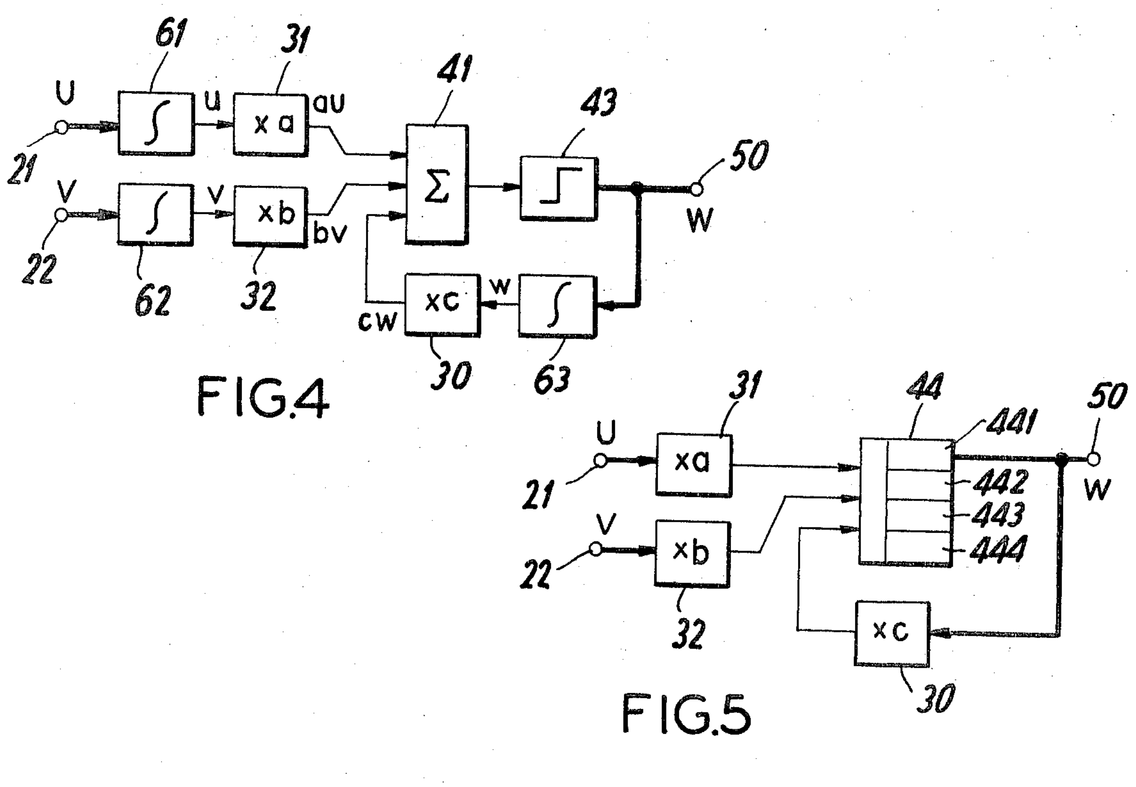
FIG. 4 shows a circuit to which the operation of FIG. 3 is compared.
FIG. 5 is a block diagram showing a second embodiment of the present invention.

It will now be explained how the delta-modulation adding circuit shown in FIG. 3 illustrates the concept of the present invention, and that the original analog signals $u$, $v$ and $w$ correspond to the delta-modulated codes U, V and W satisfy the following equation:

$$w = (-1/c)\,(au + bv) + n_q \qquad (1)$$

i.e., that an addition of the analog signals weighted by the constant coefficients $a$, $b$ and $c$ is performed. Herein, $n_q$ indicates a round-off error that occurs in the digital adders. It is generally negligible by design and, accordingly, may be neglected for the time being. The adder means 41 is a type of linear algebraic addition circuit, and both the integrator and the coefficient multipliers are linear circuits, so that their positions may be interchanged without changing the output of the adding circuit. In FIG. 4, the integration circuit 42 is replaced, or purposes of analysis, with a plurality of integrators 61, 62 and 63. It is well known that a demodulator for delta-modulation functions as an integration circuit. It is therefore understood that the outputs of the integrating circuits 61 and 62 are demodulated digital signals $u$ and $v$ of the delta-modulated code signals U and V, respectively, and that $au$ and $bv$ are obtained as outputs of the coefficient circuits 31 and 32, which are essentially digital multiplier means, respectively.

The circuit arrangement following the adder circuit 41 will now be compared with the analog-signal delta-modulating circuit shown in FIG. 1. The adder circuit 41 and the coefficient circuit 30 ($c$ being negative) correspond to the subtractor circuit 102 in FIG. 1, the sign-bit extracting circuit 43 to the polarity discriminator 104, and the integrator 63 to the integrator 103. In other words, the circuit including the elements 41, 43, 63 and 30 is a delta modulator for input digital signals ($au + bv$). Assuming that the output signal of the delta modulator is W, the output of the integrator 63 is the locally demodulated signal $w$. Accordingly, delta modulator in FIG. 4 converts the input digital signal ($au + bv$) to the delta-modulated signal W, and the negative feedback loop therein functions so that the output of the adder circuit 41, i.e., ($au + bv + cw$), may become as small as possible ($cn_q$). It is thus intended that the operation of weighted addition as given in equation (1) is carried out for $w$.

One difference between the circuit of FIG. 4 and the circuit of the present invention shown in FIG. 3 is that, since the number of integrators is smaller in FIG. 3, the circuit is simpler. A more important difference resides in the fact that once the input signals are demodulated by the integrators in the circuit arrangement in FIG. 4, the number of bits per word for digital signals in the integrators 61, 62 and 63, the coefficient circuits 31 and 32, and the addition circuit 41 must be made relatively large to cover the wide dynamic range of the demodulated digital signal. This results in a considerably more complicated circuit arrangement. In contrast, the integrator 42 is included in the feedback loop in the case of the circuit arrangement of the present invention shown in FIG. 3, and the feedback loop is subject to the negative feedback control so as to minimize the error $n_q$. Obviously, the dynamic range of the error signal $n_q$ is much smaller than that of the demodulated signal. Therefore, the number of bits required for the integrator 42 may be very small, and corresponds approximately to the distribution range of the round-off error $n_q$ at most. Furthermore, the inputs of the coefficient circuits 31 and 32 are delta-modulated codes of one bit at a time so that, unlike the case of FIG. 4, pattern generators or read only memories, both being very simple in construction, may be employed as the coefficient circuits. On the other hand, the coefficient circuits 30, 31 and 32 in FIG. 4 are the digital multipliers for digital words with plural bits and are generally complicated. The circuit arrangement of FIG. 3 may, therefore, be simplified remarkably.

Several variations of the circuit and method of FIG. 3 are illustrated in FIGS. 5 and 6. The delta-modulation adding circuit shown in FIG. 5 is constructed such that the accumulation means, which constitutes elements 41, 42 and 43 in FIG. 3, is, in this circuit, a well-known binary reversible counter 44. The operation of an integrator is equivalent to that of the reversible counter. The respective stages 441 to 444 of the reversible counter may, accordingly, be triggered by inputs from the coefficient circuits 30, 31 and 32. The output of the first stage 441 represents the sign bit, and is derived as the output of the adding circuit. In the arrangement of FIG 5, the sign-bit extracting circuit 43 is unnecessary, as the reversible counter 44 itself forms, inter alia, the extracting means.

Figure 6A:
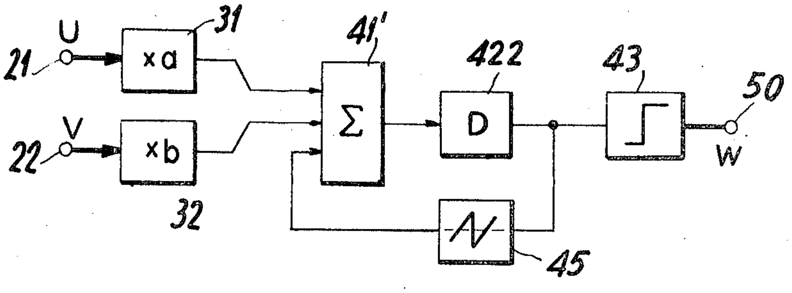
FIGS. 6*a* and 6*b* are block diagrams showing a modification of the embodiment of FIG. 5 and a detailed example thereof, respectively.

FIG. 6*a* shows another variation of the embodiment of FIG. 3. In FIG. 3, the adder 421 in the integrator 42 and the external adder 41 can be replaced by one adder 41′, so that the path from the output of the delay circuit 422 to the adder 41′ becomes a single loop. Then, the output of the adder 41′ is the sum of a directly transmitted component $x$ and a component C·sgn. ($x$) transmitted via the loop including the sign-bit extracting circuit 43 and the coefficient circuit 30 (in FIG. 3), and is given by:

$$(x + C\text{·sgn. }(x))$$

where $C$ is a negative coefficient, because of the negative feedback circuit, and where sgn. ($x$) denotes the sign of the component $x$. Accordingly, the transfer characteristics of the above-mentioned single loop can be realized by simple digital processing in which, as shown diagramatically in the block of a sign-bit extracting circuit 45 in FIG. 6, the sign bit is removed from the output of the delay circuit 422, and a bias with a fixed value is applied to the output of the delay circuit 422.

Figure 6B:
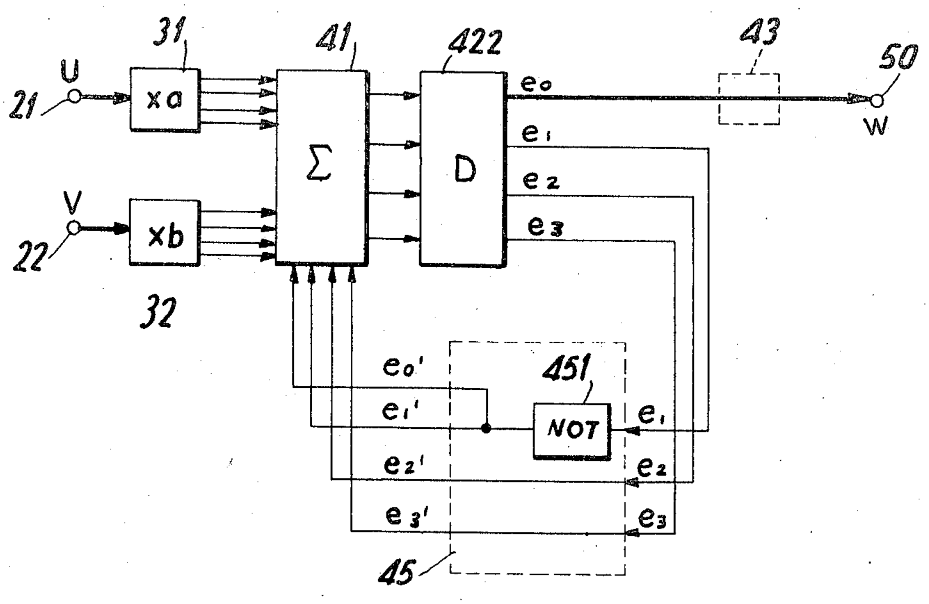

The performance of this circuit will be better understood by referring to an example shown in FIG. 6*b* in conjunction with Table 2. Suppose that the digital signal $x$ in the feedback path consists of a 4-bit binary code word ($e_0$, $e_1$, $e_2$, $e_3$) where $e_0$ is the sign bit, then this code word corresponds to each value as shown in the first column of Table 2. Let us take an example where C is chosen to be −4. Then C·sgn ($x$)=−4·sgn($x$) is −4 for the positive value of $x$, and +4 for the negative value of $x$ as shown in the second column of Table 2.

TABLE 2

| Digital signal x | | −4·sgn (x) | | x−4·sgn (x) | |
|---|---|---|---|---|---|
| Code $e_0e_1e_2e_3$ | Value | Code | Value | Code $e_0'e_1'e_2'e_3'$ | Value |
| 0 1 1 1 | +7 | 1 1 0 0 | −4 | 0 0 1 1 | +3 |
| 0 1 1 0 | +6 | 1 1 0 0 | −4 | 0 0 1 0 | +2 |
| 0 1 0 1 | +5 | 1 1 0 0 | −4 | 0 0 0 1 | +1 |
| 0 1 0 0 | +4 | 1 1 0 0 | −4 | 0 0 0 0 | +0 |
| 0 0 1 1 | +3 | 1 1 0 0 | −4 | 1 1 1 1 | −1 |
| 0 0 1 0 | +2 | 1 1 0 0 | −4 | 1 1 1 0 | −2 |
| 0 0 0 1 | +1 | 1 1 0 0 | −4 | 1 1 0 1 | −3 |
| 0 0 0 0 | +0 | 1 1 0 0 | −4 | 1 1 0 0 | −4 |
| 1 1 1 1 | −1 | 0 1 0 0 | +4 | 0 0 1 1 | +3 |
| 1 1 1 0 | −2 | 0 1 0 0 | +4 | 0 0 1 0 | +2 |
| 1 1 0 1 | −3 | 0 1 0 0 | +4 | 0 0 0 1 | +1 |
| 1 1 0 0 | −4 | 0 1 0 0 | +4 | 0 0 0 0 | +0 |

TABLE 2 – Continued

| Digital signal x | | −4·sgn (x) | | x−4·sgn (x) | |
|---|---|---|---|---|---|
| Code $e_0e_1e_2e_3$ | Value | Code | Value | Code $e_0'e_1'e_2'e_3'$ | Value |
| 1 0 1 1 | −5 | 0 1 0 0 | +4 | 1 1 1 1 | −1 |
| 1 0 1 0 | −6 | 0 1 0 0 | +4 | 1 1 1 0 | −2 |
| 1 0 0 1 | −7 | 0 1 0 0 | +4 | 1 1 0 1 | −3 |
| 1 0 0 0 | −8 | 0 1 0 0 | +4 | 1 1 0 0 | −4 |

Therefore, according to the well-known binary addition rule, the resultant code word ($e_0'$, $e_1'$, $e_2'$, $e_3'$) and the value of ($x$ + C·sgn ($x$)) is obtained as shown in the third column of Table 2. This is the operation performed in the sign-bit extracting circuit 45. The details of this circuit are shown in FIG. 6*b*. From the third column of Table 2, it can be seen that the output codes ($e_0'$, $e_1'$, $e_2'$, $e_3'$) of the sign-bit extracting circuit 45 are given by the following relationships: $e_0' = e_1' = \bar{e}_1$, $e_2' = e_2$ and $e_3' = e_3$ where $\bar{e}_1$ denotes the logical inversion or complementation of $e_1$. Therefore, $e_2$ and $e_3$ are directly connected to the $e_2'$ and $e_3'$ outputs, respectively, and $e_0'$ and $e_1'$ are obtained through a logical NOT circuit 451 with $e_1$ input. The sign-bit extracting circuit 43 is again a functional block diagram and in actuality is only a wiring connection.

The fundamental circuit in FIG. 3, which has two loops, may be converted to the single loop circuit shown in FIG. 6*a*. Other variations are, of course, possible using previously known techniques. Thus far, a description has been given of the delta-modulating adding circuit with the fundamental circuit of the present invention, and several of the modifications thereof. The application of the fundamental circuit of the invention to other digital signal processes will be described below. While the circuit of FIG. 3 will be referred to in the following description, it is understood that the above-described modifications of that circuit can likewise be employed.

Figures 7, 8:
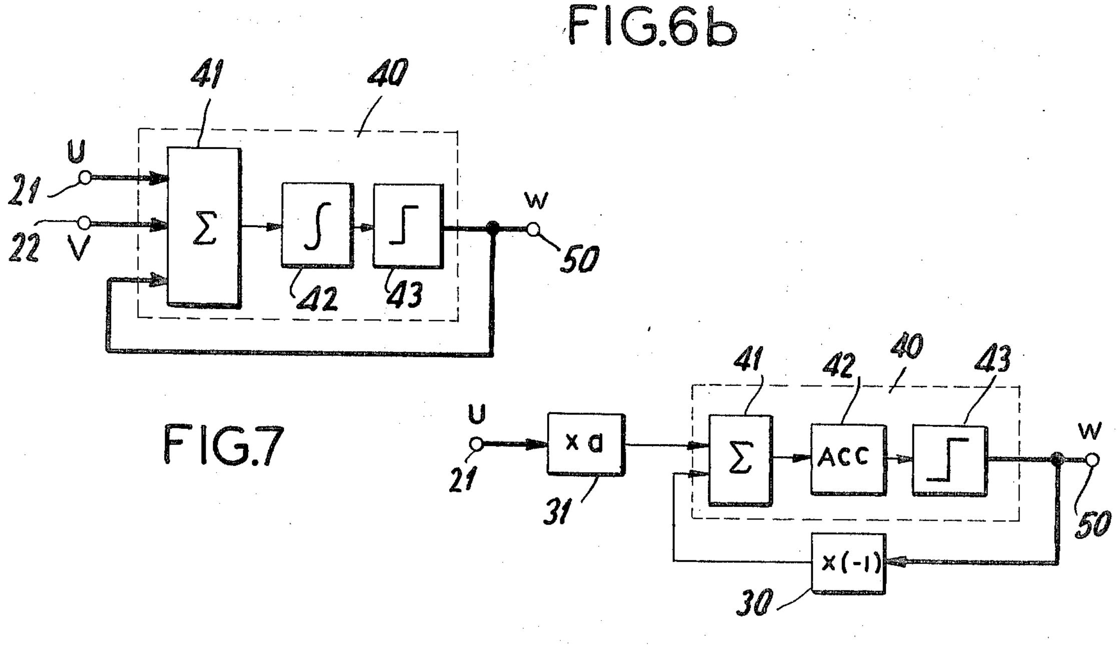
FIG. 7 shows, in block form, a third embodiment of the present invention taking the form of a synthesizer applied to a conference telephone system using delta-modulated signals.
FIG. 8 is a block diagram showing a fourth embodiment of the present invention.

FIG. 7 shows a simple adding circuit for two trains of delta-modulated signals. In this case, $a$ and $b$ are +1 while $c$ is −1. All the coefficient circuits are, therefore, eliminated. The simple addition of two information-carrying signals is required in, for example, a conference telephone system. Signals for the conference telephone system may be added in the form of delta-modulated signals by means of the circuit shown in FIG. 7.

FIG. 8 shows an embodiment for use with a digital attenuator (or amplifier). When $b$=0 in Equation (1), the signal component $w$ corresponding to the output delta-modulation signal W is given by:

$$w = -(a/c)\ u \qquad (2)$$

Figures 9A, 9B, 9C, 9D, 9E:
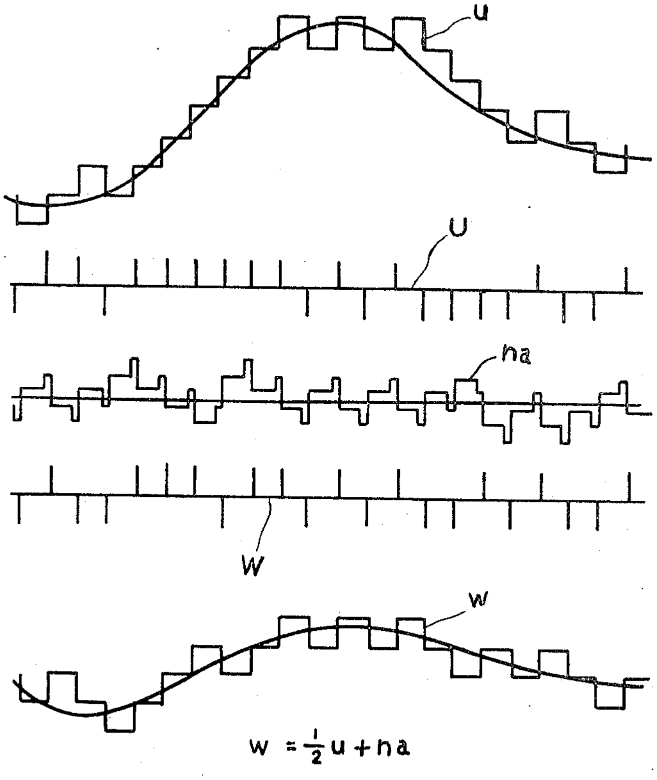
FIGS. 9*a* through 9*e* are diagrams depicting waveforms that can be observed at various points in the attenuator shown in FIG. 8.

When $c = -1$, and $a$ is larger than 1, the apparatus becomes an amplifier. When $c = -1$, and $a$ is smaller than 1, the apparatus becomes an attenuator. For example, at $a = ½$, the apparatus serves as a 6-decimal attenuator. As in waveform diagrams illustrated in FIGS. 9*a* to 9*e*, the delta-modulated signal U (FIG. 9*b*) corresponding to the analog signal $u$ (FIG. 9*a*) is transformed directly into the delta-modulated signal W (FIG. 9*d*) corresponding to the analog signal $w$ (FIG. 9*e*). FIG. 9*c* shows the waveform of the error signal $n_q$.

Figure 10:
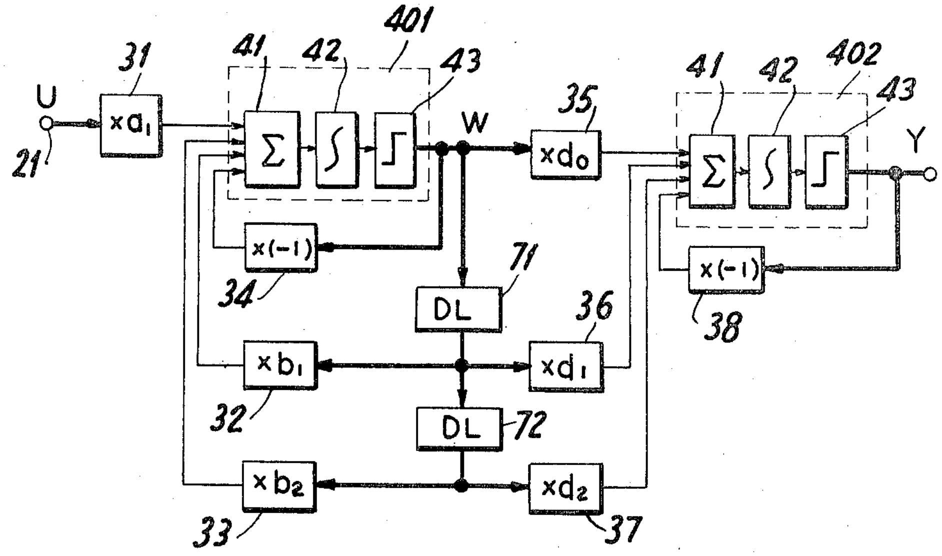
FIG. 10 is a block diagram showing a fifth embodiment of the present invention.

From the above description, it will be apparent that the fundamental circuit of the present invention shown in FIG. 3 is applicable to all known linear digital signal processes. FIG. 10 illustrates a recursive digital filter of the second degree which embodies the present invention. The construction of a prior art recursive digital filter for $n$-bit PCM codes is already known as illustrated in, e.g., the aforementioned "System Analysis by Digital Computer" by F. F. Kuo and J.F. Kaiser (page 227, FIG. 73). Since, however, one word is composed of $n$ bits, the hardware is unavoidably complicated. The digital filter of the present invention shown in FIG. 10 uses delta-modulated signals having a construction of 1 bit per word, so that the circuit arrangement is remarkably simplified. Numerals 31 to 38 designate coefficient circuits. Each of the converters 401 and 402 constitutes a delta-modulation adding circuit shown in FIG. 3, and blocks 41, 42 and 43 of each converter correspond to those of the same reference numerals in FIG. 3. In operation, an input U is transformed into a delta-modulated code W by means of blocks 31, 401 and 34. The code W is fed via $m$-bit delay circuits 71 and 72 to the coefficient multiplier circuits 32, 33, 36 and 37. The outputs of the coefficient circuits 32 and 33 are applied to the input of the converter 401, while those of the coefficient circuits 36 and 37 are applied to the input of the converter 402. Accordingly, a transfer function of the digital filter is given by:

$$H(z) = a_1 (d_0 + d_1 z^{-m} + d_2 z^{-2m}/1 + b_1 z^{-m} + b_2 z^{-2m}),$$

where $z = e^{ST}$ (S is an operator representing a complex frequency and T is the sampling interval) is an operator representing the form of a sample value and is usually termed "$z$-transformation." Since the details are contained in the aforesaid literature by Kuo and Kaiser, pp. 222–228, no further description is set forth here. Unlike conventional $n$-bit digital filters, the delay circuits 71 and 72 may be simply constructed of conventional shift registers since the delta-modulated signals having a word construction of one bit pass therethrough. A more important feature is that all the coefficient multipliers 31, 32, 33, 35, 36, 37 etc. which are indispensable to a digital filter and are generally rather complex in a conventional digital filter may be replaced by simple pattern generator circuits or read only memories. This feature greatly contributes to the simplification of the entire digital filter. While a recursive filter of the second degree has been described with reference to FIG. 10, the fundamental circuit of the present invention is, of course, generally applicable to a recursive filter of a higher degree, or to a non-recursive filter, a transversal filter, etc.

Another exemplary application of the present invention is for clock rate conversion between delta-modulated code signals. In the circuit arrangement in FIG. 3, even when the clock frequencies at the input terminals 21 and 22 and at the output terminal 50 are selected to be different from each other, the adder 41 and the integrator circuit 42 function as a buffer memory for the difference in clock rates, because a conventional adder can operate asynchronously. Thus, the clock rate conversion between the input and output code signals can be carried out. For example, if the clock rate of the output as well as the feedback loop is selected at double the frequency at the inputs 21 and 22, the input signals may be transformed into delta-modulated signals which are doubled in clock rate. In general, the higher the clock rate, the smaller the round-off error $n_q$ becomes. By way of example, it is assumed that the clock frequency of the input U and the output Y in the digital filter in FIG. 10 is set at $f_0$, while that of the delta-modulated code signal W at the intermediate stage is set at $4f_0$. Then, the round-off error caused by the converter 401 can be made so small as to be negligible. The capability for clock rate conversion is accordingly of great practical importance. As a further application of its clock rate conversion capability, the circuit of the present invention may also be adopted when the input U and the output W in the circuit in FIG. 3 are nearly equal in clock rate, but are not in phase with each other. This means that two independent digital communication networks may be connected without achieving perfect synchronization between them. This is also very significant in practical use.

Mutual conversion between a delta modulated signal and a delta-sigma modulated signal or between a single integral type and a double integral type delta modulated signal may likewise be carried out using the circuit and method of the present invention as an application of a digital filter. In case of conversion from a delta modulated signal to a delta-sigma modulated signal, since the transfer characteristics differ by 6db/octave, a first-degree digital filter for the characteristic compensation of 6db/octave may be inserted. It is also apparent that a filter of the first degree may be constructed from the filter of the second degree in FIG. 10 by rendering the corresponding coefficients zero.

Figure 11:
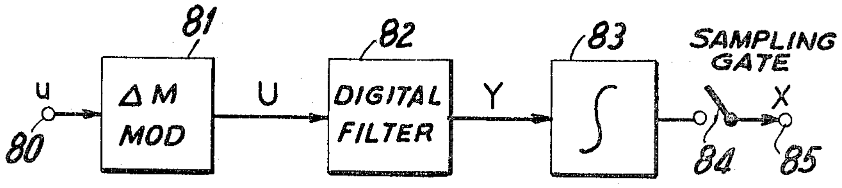
FIG. 11 is a block diagram showing PCM coding terminal equipment wherein the digital filter of the present invention is used.

A practical example of the application of the present invention is a digital terminal station. In previously known PCM communication systems, analog signals are transformed into PCM signals by a highly accurate PCM coder and the PCM signals are then transmitted. Considering the future development of IC techniques, however, the way to attain inexpensive circuits with high reliability is to digitalize as many circuits as possible so they can be accommodated in the form of LSI on a small IC substrate. In this respect, as shown in FIG. 11, it is suggested that an analog signal be converted into a delta-modulated signal U by means of a delta-modulation coder 81, which is the simplest analog-to-digital converter. The high frequency components of information signals and quantization noise are removed by means of a delta-modulation digital filter 82 as shown in FIG. 10. Thereafter the delta-modulated signal is supplied through an integrator 83 to a sampling gate 84 to obtain the usual PCM signal at the output of the gate 84. More specifically, the outputs of the integrator 83 may be considered to be PCM signals with a high sampling frequency ($n$ times as high as the clock $f_0$ of PCM). The sampling gate 84 derives the outputs of the integrator at a rate of 1 to $n$ (the remaining $n - 1$) outputs are not used). The derived signal X becomes the PCM signal with the frequency $f_0$. In accordance with this circuit construction, a highly-precise and expensive prior art analog-to-digital converter may be replaced with a small-sized converter which is stable and integrated.

As described above in detail, the present invention provides the digital signal processing circuit adapted to apply digital processing directly to delta-modulated codes. It will be apparent to those skilled in the art that many variations of the foregoing embodiments can be realized within the spirit and scope of the invention.

I claim:

1. A delta-modulated signal processing circuit comprising:

first multiplier means for multiplying a delta-modulated input signal by a first constant to provide a first code signal, second multiplier means for multiplying a delta-modulated output signal by a second constant to provide a second code signal, digital adder means for taking an algebraic sum of said first and second code signals, digital integrator means for integrating the output of said digital adder means to produce a signal including sign indicating bits and sign bit extracting means for extracting the sign indicating bits from the output signals of said digital integrator means thereby providing said delta-modulated output signal.

2. A delta-modulated signal processing circuit according to claim 1, wherein at least one of said constants has an absolute value of one.

3. A delta-modulated signal processing circuit according to claim 1, further comprising a delay means for causing the said second code signal to be supplied to said digital adder means at a time later than the time at which the portion of said first code signal from which said second code signal is derived arrives at the digital adder means.

4. A delta-modulated signal processing circuit comprising digital adder means for taking an algebraic sum of at least two delta-modulated input signals and a coded output signal, digital integrator means for integrating the output of the digital adder means to produce a signal including sign-indicating bits, and sign-bit extractor means for extracting the sign-indicating bits from the output signals of said digital integrator means, the output of said extractor means being supplied to said adder means as said coded output signal.

5. A method of processing a delta-modulated signal comprising:

multiplying a delta-modulated input signal by a first constant to provide a first code signal;

algebraically adding the first code signal to a previously derived second code signal;

integrating the algebraically added signals to produce a signal including sign-indicating bits;

extracting the sign-indicating bit from the signal produced by integration, thereby providing a delta-modulated output signal; and multiplying the delta-modulated output signal by a second constant to provide said second code signal for addition to the first code signal.

* * * * *